Figure 1:
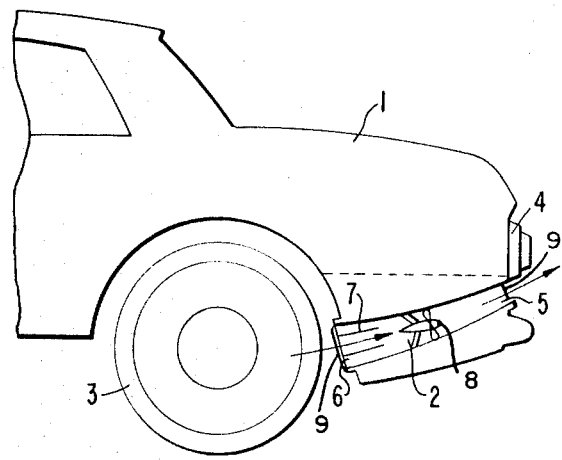

United States Patent

[11] 3,591,229

[72] Inventors Karl Wilfert
 Gerlingen-Waldstadt;
 Hans Götz, Magstadt, Wurttemberg, both of, Germany
[21] Appl. No. 744,067
[22] Filed July 11, 1968
[45] Patented July 6, 1971
[73] Assignee Daimler-Benz Aktiengesellschaft
 Stuttgart-Unterturkheim, Germany
[32] Priority July 14, 1967
[33] Germany
[31] D 53598 II/63c

[54] INSTALLATION FOR REDUCING THE SOILING OF REAR LIGHTS OR THE LIKE AT MOTOR VEHICLE BODIES
9 Claims, 2 Drawing Figs.

[52] U.S. Cl. .................................................. 296/1, 240/8.3
[51] Int. Cl. ........................................................ B62d 35/00
[50] Field of Search ............................................ 296/1 S, 91; 240/8.3

[56] References Cited
UNITED STATES PATENTS

| 2,199,883 | 5/1940 | Ishiwata | 296/1 S X |
| 1,923,349 | 8/1933 | Wolverton | 296/1 S |
| 1,871,396 | 8/1932 | Stalker | 296/1 S |

FOREIGN PATENTS

| 443,903 | 3/1936 | Great Britain | 296/1 S |
| 162,423 | 3/1958 | Sweden | 240/8.3 |

Primary Examiner—Philip Goodman
Attorney—Craig, Antonelli, Stewart & Hill

ABSTRACT: An installation for reducing the soiling of rear lights or the like in motor vehicle bodies which is characterized by an air guide system that discharges within the area of the rear lights and preferably commences at such places of the body, at which a dynamic air pressure occurs during the drive.

PATENTED JUL 6 1971          3,591,229

INVENTORS
KARL WILFERT
HANS GÖTZ

BY Craig & Antonelli
ATTORNEYS

INSTALLATION FOR REDUCING THE SOILING OF REAR LIGHTS OR THE LIKE AT MOTOR VEHICLE BODIES

The present invention relates to an installation for reducing the soiling of rear lights or the like at motor vehicle bodies, especially at bodies with a rear end extending essentially perpendicularly to the driving direction.

The rear lights of motor vehicles are exposed, as is known, to a relatively strong soiling by the dust thrown up from the road or also by other thrown-up dirt particles or insects. Particularly during longer drives, for example, on alternately wet and dusty road surfaces, an impairment of the light effect of the rear lights may occur as a result thereof, which may lead to an endangering of the safety of the vehicle without being noticed by the driver himself.

The present invention therefore aims at eliminating these drawbacks as much as possible and to create an installation for motor vehicle bodies which reduces the soiling of the rear lights. The motor vehicle body according to the present invention is characterized by air guidance installations connected with the body which discharge within the area of the rear lights and preferably begin at such places of the body, at which a dynamic air pressure occurs during the drive. It is achieved by such a construction according to the present invention that a pressure equalization can take place between the rear end of the vehicle within the area of the rear lights with areas of higher pressures which is able to reduce the formation of turbulence and eddies at the rear end of the motor vehicle and therewith the throwing up and swirling of dust connected therewith; on the one hand, with a dynamic pressure ventilation, an airstream or flow can be achieved within the area of the rear lights which far reachingly prevents contact of air enriched with dust and dirt with the rear lights.

An advantageous construction is achieved according to the present invention if the air guidance installations are constructed as one or several air guide channels or ducts which begin at the body floor within the area to the rear of the rear wheels and discharge directly below the rear lights. Only one air guide channel may be provided thereby whose discharge orifice may be constructed as a horizontal slot extending over nearly the entire width of the rear end and whose inlet aperture is constructed as a horizontal inlet connection provided essentially between the rear wheels and protruding downwardly into the area below the vehicle floor. The inlet connection may thereby have appropriately a larger flow cross section than the outlet or discharge slot because a certain nozzle effect is then achieved, which may produce a relatively high discharge velocity of the air below the rear lights. In order to avoid that particles thrown up from the road, can penetrate or enter into the inlet connection of the air guide channel, provision may be made that the inlet connection is provided with inlet guide plates of sheet metal and/or with cover screens or the like. Furthermore, provision may also be made to additionally arrange blowers or fans within the air guide channel for the increase of the air velocity.

Accordingly, it is an object of the present invention to provide an installation for the reduction of the soiling of rear lights or the like at motor vehicles which avoids by simple means the aforementioned shortcomings and drawbacks encountered in the prior art.

Another object of the present invention resides in a motor vehicle body which considerably reduces the soiling of the rear lights or the like in motor vehicles, caused by dust and dirt thrown up from the road.

A further object of the present invention resides in a motor vehicle body which increases the safety to the passengers of the vehicle by assuring a good lighting effect of the rear lights under all driving conditions.

Figure 2:
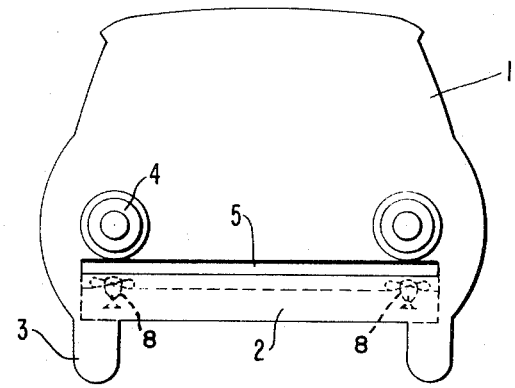

These and further objects, features, and advantages of the present invention will become more obvious from the following description when taken in connection with the accompanying drawing which shows, for purposes of illustration only, one embodiment in accordance with the present invention, and wherein:

FIG. 1 is a schematic longitudinal cross-sectional view through the rear end of a motor vehicle with an air guide channel extending within the body from the area to the rear of the rear wheels up to below the rear lights; and FIG. 2 is a schematic rear elevational view of the motor vehicle illustrated in FIG. 1.

Referring now to the drawing wherein like reference numerals are used throughout the two views to designate like parts, FIGS. 1 and 2 illustrate schematically a rear section of an otherwise conventional motor vehicle body 1 within which is arranged an air guide channel 2 in the rear part thereof. The air guide channel 2 extends from the area to the rear of the rear wheels 3 with a slight upward inclination within the area below the luggage space indicated in dash line up to the area of the rear lights 4 where it terminates in a slot 5 extending nearly over the entire width of the rear end of the vehicle body.

At the inlet into the air guide channel 2 is arranged an inlet connection 6 which is provided with guide plates 7 and which projects down into the area below the vehicle floor. A dynamic pressure forms during the drive in front of the inlet connection 6, which may be additionally provided with one or several cover screens 9 that prevent the entry of dust particles into the air guide channel 2, with this construction which effects that air enters the air guide channel 2 and leaves the same again through slot 5 in the direction of the arrows. The airflow in the air guide channel 2 is additionally favored by the fact that within the area of the rear lights 4 as also within the remaining area of the rear section within which extends the slot 5, a relatively large vacuum occurs during the drive. The flowing air therefore leaves the discharge slot upwardly at an inclination and prevents that dust particles which are thrown up from the road at the body rear section, can impinge on the rear lights 4. In addition to this "air curtain effect," it is further achieved by the construction according to the present invention that the vacuum occurring in general at the rear of the vehicle is reduced and thus the turbulence formation at the rear is reduced which is essentially responsible for the soiling of the rear lights. Blowers or fans 8 can additionally be arranged with the air guide channel 2 for increasing the air velocity as well as removing the dust from the rear lights when the vehicle is at a standstill.

While we have shown and described only schematically one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are encompassed by the scope of the appended claims.

We claim:

1. An installation for reducing the soiling of rear lights or the like at motor vehicle bodies, in particular at bodies with a rear face extending essentially perpendicularly to the driving direction, characterized by air guidance means connected with the body which discharge within the area of the rear lights, wherein the air guidance means in constructed as at least one air guidance channel having an inlet aperture constructed as an inlet connection with a larger flow cross section than the discharge aperture of the air guidance channel, which air guidance channel begins at the vehicle floor within the area to the rear of the rear wheels and discharges directly below the rear lights.

2. An installation according to claim 1, wherein said air guidance means forms several air guide channels.

3. An installation according to claim 1, wherein only a single air guide channel is provided whose discharge aperture is constructed as an essentially horizontal slot extending at least nearly over the entire width of the rear end and whose inlet aperture is provided essentially between the rear wheels and projecting down into the area below the vehicle floor.

4. An installation according to claim 1, wherein said inlet connection is provided with inlet guide plate means.

5. An installation according to claim 4, wherein said inlet connection is provided with cover screen means.

6. An installation according to claim 5, further comprising additional blower means within the air guide channel means for increasing the air velocity.

7. An installation according to claim 1, further comprising additional blower means within the air guide channel means for increasing the air velocity.

8. An installation according to claim 3, wherein said inlet connection is provided with inlet guide plate means.

9. An installation according to claim 3, wherein said inlet connection is provided with cover screen means.